(12) United States Patent
Barrientos Blanco (10) Patent No.: US 11,796,011 B2
(45) Date of Patent: Oct. 24, 2023

(54) SYNCHRONIZING RING

(71) Applicant: Ningbo Geely Automobile Research & Development Co., Ltd., Ningbo (CN)

(72) Inventor: Eva Barrientos Blanco, Gothenburg (SE)

(73) Assignee: Ningbo Geely Automobile Research & Development Co., Ningbo (CN)

( * ) Notice: Subject to any disclaimer, the term of this patent is extended or adjusted under 35 U.S.C. 154(b) by 114 days.

(21) Appl. No.: 17/409,175

(22) Filed: Aug. 23, 2021

(65) Prior Publication Data

US 2021/0381558 A1    Dec. 9, 2021

Related U.S. Application Data

(63) Continuation of application No. PCT/CN2020/075555, filed on Feb. 17, 2020.

(30) Foreign Application Priority Data

Mar. 13, 2019    (EP) .................................... 19162617

(51) Int. Cl.
*F16D 23/02* (2006.01)
*F16D 23/06* (2006.01)

(52) U.S. Cl.
CPC .......... *F16D 23/025* (2013.01); *F16D 23/06* (2013.01); *F16D 2023/0681* (2013.01); *F16D 2300/06* (2013.01)

(58) Field of Classification Search
CPC ............... F16D 23/025; F16D 23/06; F16D 2023/0681; F16D 2300/06; F16H 57/0478

USPC ........................................................ 192/53.32
See application file for complete search history.

(56) References Cited

U.S. PATENT DOCUMENTS

| | | | | |
|---|---|---|---|---|
| 5,135,087 A | * | 8/1992 | Frost | F16D 23/06 192/53.31 |
| 5,657,844 A | * | 8/1997 | Wagner | F16D 23/06 192/53.32 |
| 2008/0017470 A1 | | 1/2008 | Stockl | |
| 2016/0281798 A1 | | 9/2016 | Dongaonkar | |
| 2022/0082136 A1 | * | 3/2022 | Barrientos Blanco | F16D 23/025 |

FOREIGN PATENT DOCUMENTS

| CN | 1203333 A | 12/1998 |
|---|---|---|
| CN | 101622466 A | 1/2010 |
| CN | 201575086 U | 9/2010 |
| CN | 102575725 A | 7/2012 |
| CN | 103790994 A | 5/2014 |

(Continued)

OTHER PUBLICATIONS

Search Report from corresponding Chinese Application No. 2020800197827 dated Dec. 30, 2022, 2 pages.

(Continued)

*Primary Examiner* — Richard M Lorence
(74) *Attorney, Agent, or Firm* — TUCKER ELLIS LLP (57) ABSTRACT

A synchronizing ring for a synchronizer of a transmission. The inside of the synchronizing ring being provided with a plurality of cams and corresponding recesses between the cams for receiving a plurality of axial protrusions of a further synchronizing ring. An inner radial surface of each cam is provided with a plurality of grooves for transportation of oil.

17 Claims, 6 Drawing Sheets

(56) References Cited

FOREIGN PATENT DOCUMENTS

| | | |
|---|---|---|
| CN | 203868174 U | 10/2014 |
| CN | 204164208 U | 2/2015 |
| CN | 104632924 A | 5/2015 |
| CN | 204493490 U | 7/2015 |
| DE | 102007061646 A1 | 7/2009 |
| EP | 1248006 A1 | 10/2002 |
| JP | 2006-9952 A | 1/2006 |
| KR | 19980074113 A | 11/1998 |
| KR | 20080029136 A | 4/2008 |

OTHER PUBLICATIONS

International Search Report from corresponding International Application No. PCT/CN2020/075555, dated May 19, 2020, 3 pages.

\* cited by examiner

SYNCHRONIZING RING

RELATED APPLICATION DATA

This application is a continuation of International Patent Application No. PCT/CN2020/075555, filed Feb. 17, 2020, which claims the benefit of European Patent Application No. 19162617.5, filed Mar. 13, 2019, the disclosures of which are incorporated herein by reference in their entireties.

TECHNICAL FIELD

The invention relates to a synchronizing ring for a synchronizer of a transmission where the inside of the synchronizing ring being provided with a plurality of cams and corresponding recesses between the cams for receiving a plurality of axial protrusions of a further synchronizing ring. In addition, the invention relates to a synchronizer for a vehicle transmission which synchronizer comprises such a synchronizing ring.

BACKGROUND

Transmissions usually have synchronizers for shifting gears. For example, an idle gear wheel that is journaled on an output shaft and engaged with a gear wheel arranged on an input shaft, can be connected to the output shaft by a synchronizer. The synchronizer has a sleeve that is brought into engagement with a dog ring of the idle gear wheel by means of teeth. The sleeve is connected to a hub by means of a spline joint. The hub is in turn rotationally locked relative to the output shaft. Thus, when the sleeve and the dog ring are engaged, the idle gear wheel and the output shaft are rotationally locked relative to each other via the synchronizer and torque can be transferred.

When shifting gears, before displacement of the sleeve for engaging the dog ring, the rotation speeds of the idle gear wheel and the sleeve have however to be synchronized.

For this reason, friction rings can be used, and particularly a blocker or blocking ring can be used for pre-synchronization in a synchronizer. On the inside of such a blocking ring for a multi-cone synchronizer, cams and recesses can be arranged for receiving axial protrusions of an inner ring.

SUMMARY

An objective of the invention is to provide a synchronizing ring for improving lubrication of the synchronizer.

The objective is achieved by a synchronizing ring for a synchronizer of a transmission, wherein the inside of the synchronizing ring is provided with a plurality of cams and corresponding recesses between the cams for receiving a plurality of axial protrusions of a further synchronizing ring, and wherein an inner radial surface of each cam is provided with a plurality of grooves for transportation of oil.

The invention is based on the insight that a small gap formed between the axial surfaces of the cams of the synchronizing ring and a component such as a hub of the synchronizer, may under unfavourable conditions lead to oil being stuck in the gap and dried oil is sticking on the component. The grooves arranged in the cams will eliminate or at least reduce such a problem by providing an improved circulation of oil in the synchronizer.

According to one embodiment, each groove has a longitudinal extension direction in parallel with the longitudinal extension direction of the synchronizing ring, and preferably the length of each groove is equal to the extension of the cam in the longitudinal extension direction of the synchronizing ring. Hereby, oil can be transported from the axial surface to an opposite axial side of the cam, thereby increasing the circulation of oil in the synchronizer.

Each cam can have 2-20 grooves, preferably 3-10 grooves and more preferably 4-8 grooves, for drainage of oil from the gap. The cross section area of each groove can be in the interval 1-20 $mm^2$, preferably 2-15 $mm^2$. For example, the cross-section of each groove can be semi-circular with a diameter in the interval 2-8 mm, preferably 3-6 mm.

The synchronizing ring can be an external ring to be arranged outside the further synchronizing ring being an inner ring. The synchronizing ring can have teeth on the outside for interacting with a sleeve of the synchronizer.

For example, the synchronizing ring can be a blocker or blocking ring for a synchronizer which blocking ring interacts with one or more struts of the synchronizer for pre-synchronization when a sleeve is displaced for shifting gears.

The synchronizer can be a multi-cone synchronizer, such as a double or triple cone synchronizer.

The features of the invention can be advantageously used when the synchronizing ring has two or more cams. The synchronizing ring can have a number of cams being a multiple of 3 for instance. The number of cams is often in the interval 3-9.

Each cam can have two main extension directions; one first main extension direction in the circumferential direction of the synchronizing ring and a second main extension direction in the radial direction of the synchronizing ring. The axial surface defined by these main directions is often arranged with a small gap relative to an axial surface of a synchronizer hub, since the packing space is limited.

Due to the relatively large total area of the axial surfaces of the cams, particularly since the total circumferential length of the cams often is at least equal to the total circumferential length of the recesses between the cams, it has been found out that the grooves can improve the lubrication to a significant extent.

According to another aspect of the invention, a further objective is to provide a synchronizer for a vehicle transmission enabling improved lubrication.

This objective is achieved by a synchronizer comprising a synchronizing ring, a component and a further synchronizing ring, wherein the inside of the synchronizing ring is provided with a plurality of cams and corresponding recesses between the cams for receiving a plurality of axial protrusions of the further synchronizing ring, and an inner radial surface of each cam is provided with a plurality of grooves for transportation of oil from a gap formed between an axial surface of each cam and the component.

The advantages of the synchronizer are similar to the advantages already discussed hereinabove with reference to the different embodiments of the synchronizing ring.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS

Figure 1:
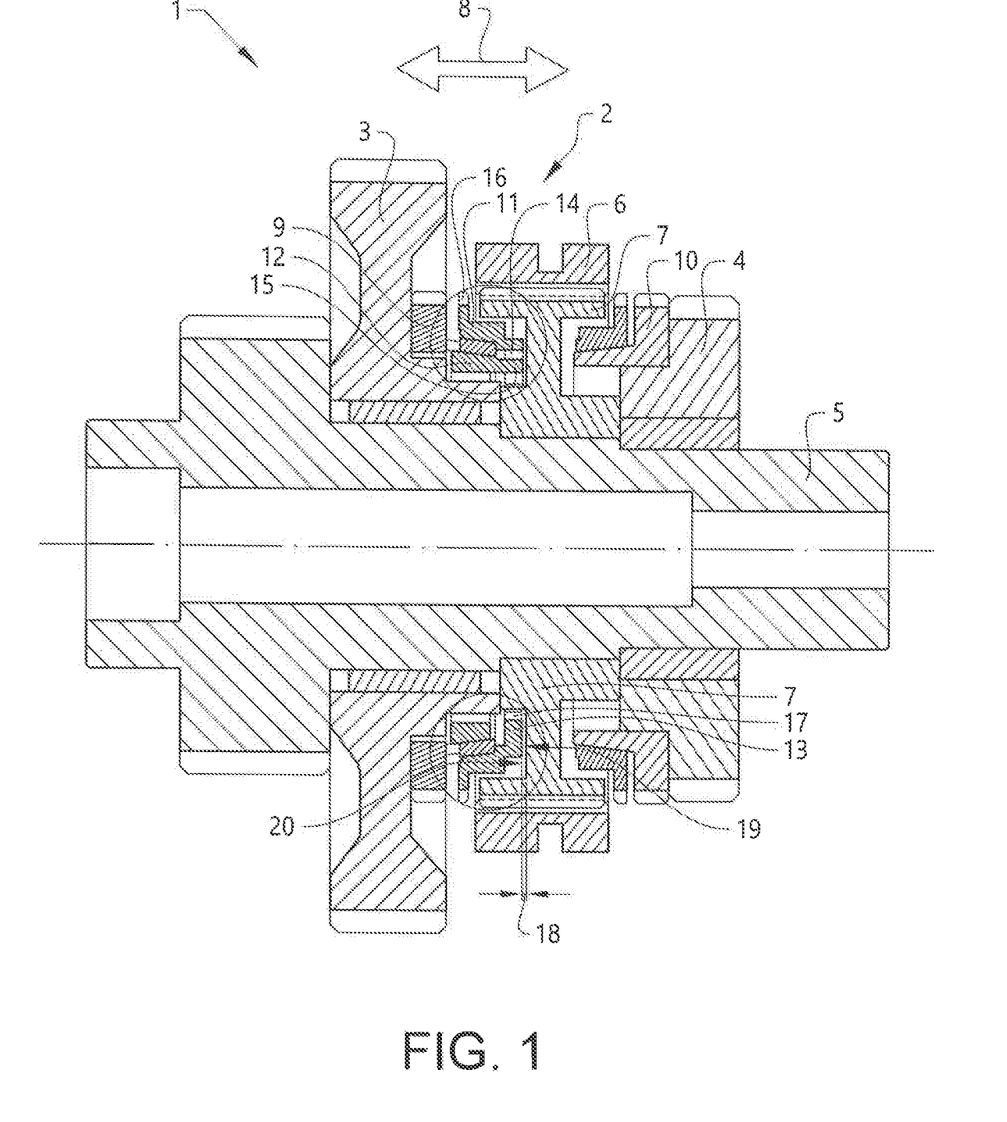
FIG. 1 is a cut view of a synchronizer of a vehicle transmission.

FIG. 1 is a cut view of a transmission 1 having a synchronizer 2. The synchronizer 2 can be used to rotationally lock a first gear wheel 3 and a second gear wheel 4 to a shaft 5 of the transmission 1. For this purpose the synchronizer 2 has a displaceable sleeve 6 arranged on a hub 7. In FIG. 1 the sleeve 6 is positioned in a neutral position. If the sleeve 6 is moved from the neutral position in an axial direction 8 of the synchronizer 2 towards the first gear wheel 3, the sleeve 6 will engage a dog ring 9 of the first gear wheel 3 and thereby lock the first gear wheel 3 to the shaft 5. If instead the sleeve 6 is moved in the axial direction 8 towards the second gear wheel 4, the sleeve 6 will engage a clutch cone ring 10 and thereby lock the second gear wheel 4 to the shaft 5.

The synchronizer 2 comprises a synchronizing ring 11, a component 7 and a further synchronizing ring 12. The inside of the synchronizing ring 11 is provided with a plurality of cams 13 and corresponding recesses 14 between the cams 13 for receiving a plurality of axial protrusions 15 of the further synchronizing ring 12. The outside of the synchronizing ring 11 can be provided with teeth 16 for engagement with the sleeve 6.

An inner radial surface of each cam 13 is provided with a plurality of grooves 17 for transportation of oil from a gap 18 formed between an axial surface 19 of each cam 13 and the component 7. Each groove 17 forms a channel for transportation of oil. The component is here the hub 7 on which the sleeve 6 is arranged. The gap 18 is formed between the axial surface 19 of the cam 13 and an opposing axial surface 20 of the hub 7. The grooves 17 of the synchronizing ring 11 will be further described hereinafter with reference to further figures. The synchronizing ring 11 is an external ring arranged outside of the further synchronizing ring 12 being an inner ring.

Figure 2A:
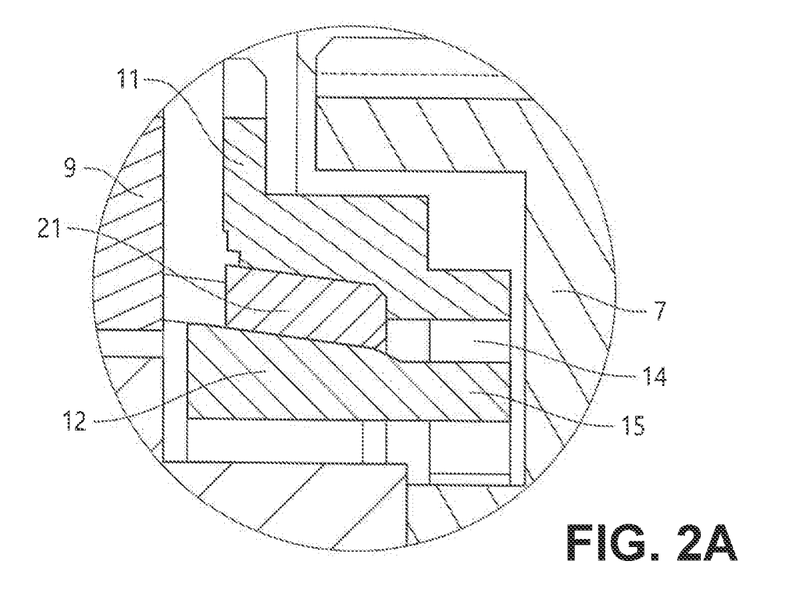
FIG. 2A is an enlarged view of a part of the synchronizer in FIG. 1.
Figure 2B:
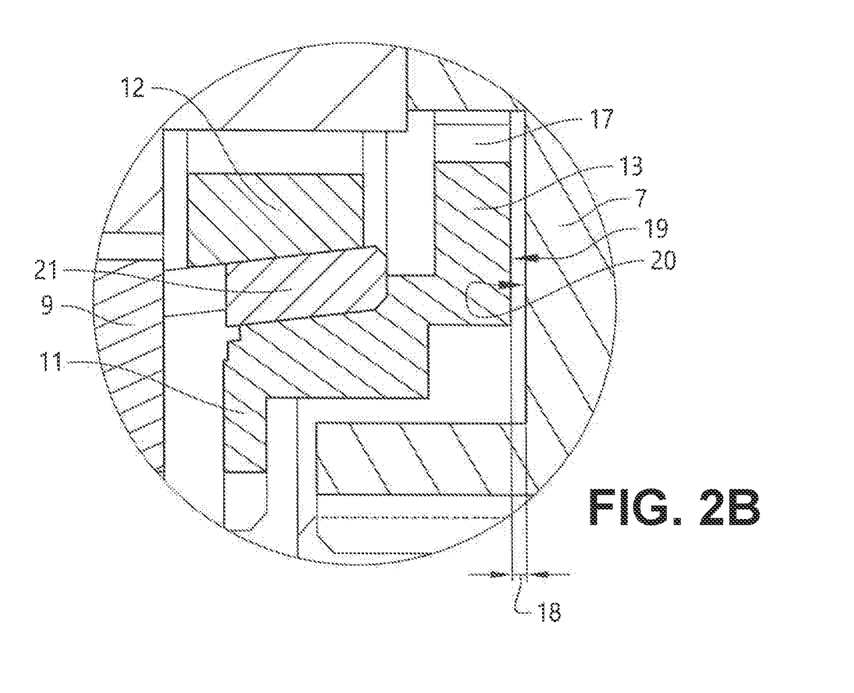
FIG. 2B is an enlarged view of a part of the synchronizer in FIG. 1.

FIGS. 2A and 2B are enlarged views of parts of the synchronizer 2 in FIG. 1. In addition to the dog ring 9 and the hub 7, friction or synchronizing rings are shown. In the example embodiment illustrated in FIG. 1, the synchronizer 2 is a double-cone synchronizer. The synchronizer 2 has the external synchronizing ring 11, an intermediate synchronizing ring 21 and the inner synchronizing ring 12. The external synchronizing ring will also be referred to as the synchronizing ring 11 or blocking ring. The inner synchronizing ring will also be referred to as the further synchronizing ring 12 or inner ring. When the sleeve 6 is initially moved towards the first gear wheel 3, the blocking ring 11 will be contacted by one or more struts (not shown) of the synchronizer 2 for pre-synchronization. Each strut is arranged on the hub 7 and can be displaced in the axial direction 8 relative to the hub 7 together with the sleeve 6 for engagement with the blocking ring 11.

In FIG. 2A, one said axial protrusion 15 of the inner ring 12 received in one said recess 14 of the blocking ring 11 is illustrated, whereas in FIG. 2B one said cam 13 of the blocking ring 11 is illustrated. The cam 13 is illustrated with one of said plurality of grooves 17 for enabling transportation of oil from the gap 18 formed between the axial surface 19 of the cam 13 and the axial surface 20 of the hub 7.

Figure 2C:
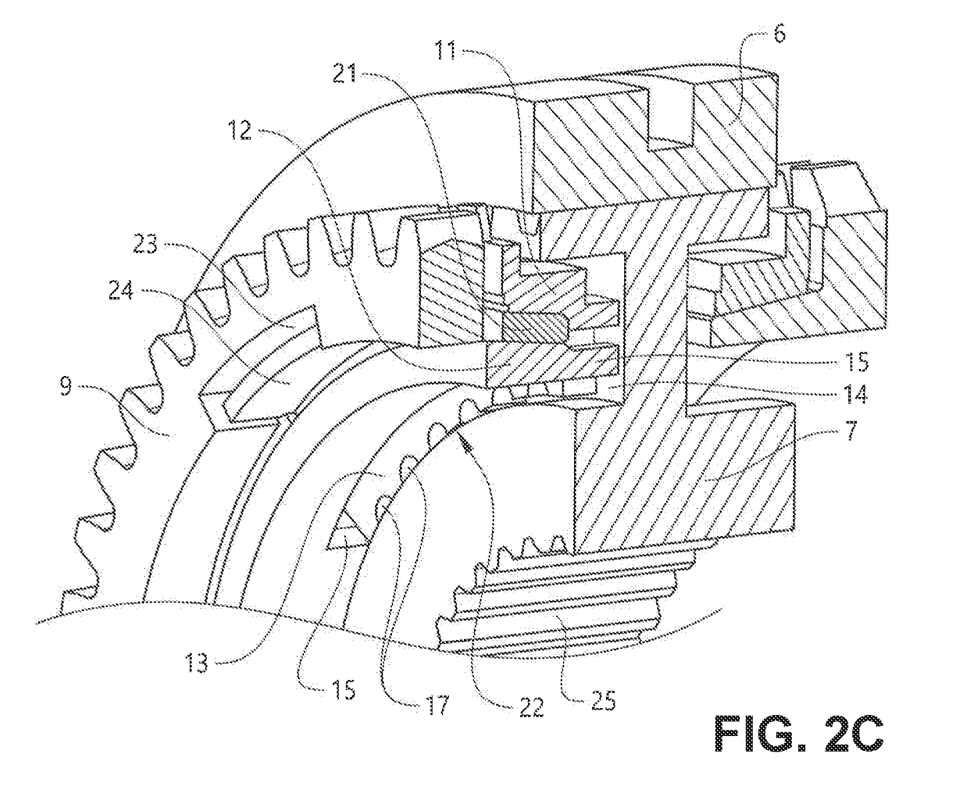
FIG. 2C is a perspective view of a part of the synchronizer in FIG. 1.

In the cut perspective view of the synchronizer 2 shown in FIG. 2C, the synchronizing ring 11 provided with the cam 13 with the inner radial surface 22 having the grooves 17 is illustrated. One axial protrusion 15 of the inner ring 12 received by a recess 14 of the synchronizing ring 11 is illustrated on each side of the cam 13. Further, a recess 23 of the dog ring 9 receiving an axial protrusion 24 of the intermediate ring 21 is shown. The hub 7 with splines 25 for connection to the shaft 5 and the sleeve 6 arranged on the hub 8 are also illustrated.

Figure 3A:
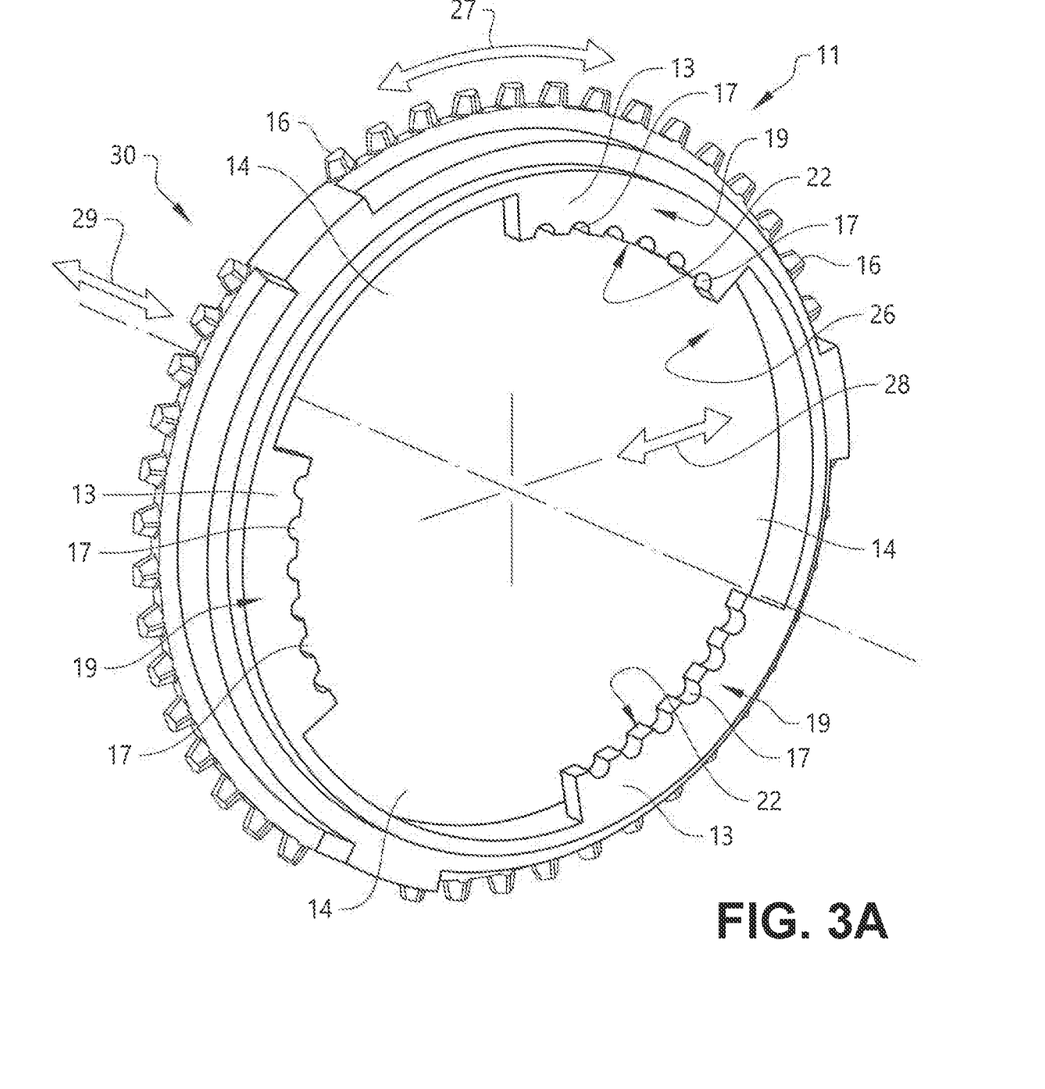
FIG. 3A is perspective view of a synchronizing ring.
Figure 3B:
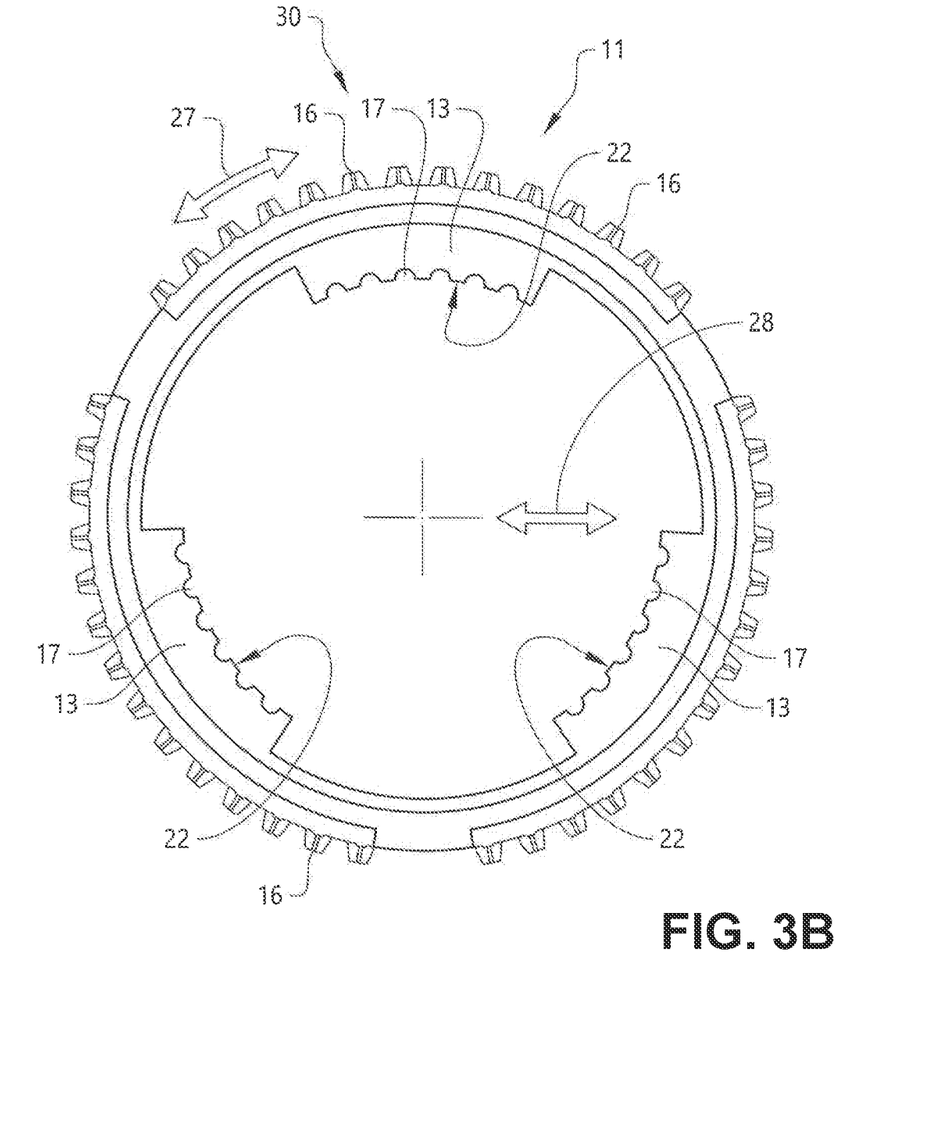
FIG. 3B is a front view of the synchronizing ring in FIG. 3A.
Figure 3C:
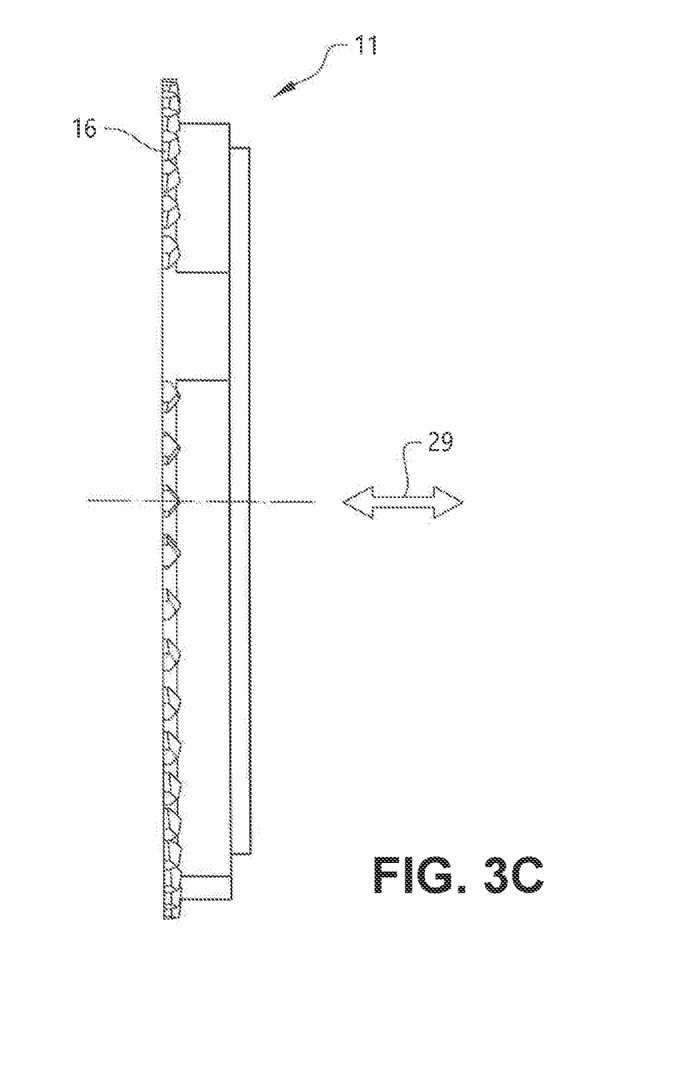
FIG. 3C is a side view of the synchronizing ring in FIG. 3A.

In FIGS. 3A, 3B and 3C the synchronizing ring 11 is illustrated more in detail. FIG. 3A is a perspective view of the synchronizing ring 11, FIG. 3B is a front view and FIG. 3C is a side view of the synchronizing ring 11.

FIG. 3A is a perspective view showing the cams 13 and recesses 14 of the synchronizing ring 11. The inside 26 of the synchronizing ring 11 is provided with the plurality of cams 13 and corresponding recesses 14 between the cams 13 for receiving the plurality of axial protrusions 15 of the further synchronizing ring 12. The inner radial surface 22 of each cam 13 is provided with the plurality of grooves 17 for transportation of oil. The grooves 17 can be used for transportation of oil from the gap 18 formed between the axial surface 19 of each cam 13 and a component 7 of the synchronizer 2, such as the hub 7 when the synchronizing ring 11 is installed in the synchronizer 2.

Each cam 13 has suitably two main extension directions, one first main extension direction in the circumferential direction 27 of the synchronizing ring 11 and a second main extension direction in the radial direction 28 of the synchronizing ring 11. In addition, each cam 13 has a third extension direction or thickness in the longitudinal direction 29 or axial direction of the synchronizing ring. This direction is in parallel with the axial direction 8 of the synchronizer 2 when the synchronizing ring 11 is installed in the synchronizer 2.

Each groove 17 can have a longitudinal extension direction in parallel with the longitudinal extension direction 29 of the synchronizing ring 11. The length of each groove 17 is preferably equal to the extension of the cam 13 in the longitudinal extension direction 29 of the synchronizing ring 11. Hereby, each groove forms a channel extending from one side of the cam to another side of the cam.

Although the example embodiment of the synchronizing ring 11 illustrated in FIG. 3A has three cams 13 and three recesses 14, the number of cams 13 and recesses 14 can of course be different for other synchronizing rings. The synchronizing ring 11 has preferably a number of cams 13 being a multiple of 3, and often the synchronizing ring 11 has a number of cams in the interval 3-9.

For an increased circumferential length and/or radial extension of the cams 13, the need of the grooves 17 will increase. Often the total circumferential length of the cams 13 is at least equal to the total circumferential length of the recesses 14 between the cams 13 which means that the area defined by the axial surfaces 19 of the cams 13 where the cams 13 and the hub 7 overlap and form the gap 18 is not negligible.

Each cam 13 can have 2-20 grooves, preferably 3-10 grooves and more preferably 4-8 grooves. Of course, in addition to the number of grooves 17 also the size of the grooves, i.e. the cross-section dimensions, and the shape of the grooves, can be varied and adapted to the current application.

As also illustrated in the example embodiment shown in FIG. 3B, each cam 13 can have six grooves 17 arranged on the inner radial surface 22 where each groove 17 has a length corresponding to the thickness of the cam 13, and each groove 17 has a semi-circular cross section.

The outside 30 of the synchronizing ring 11 is suitably provided with the teeth 16 for engagement with the sleeve 6.

It is to be understood that the present invention is not limited to the embodiments described above and illustrated in the drawings; rather, the skilled person will recognize that many changes and modifications may be made within the scope of the appended claims.

What is claimed is:

1. A synchronizing ring for a synchronizer of a transmission, the inside of the synchronizing ring being provided with a plurality of cams and corresponding recesses between the cams for receiving a plurality of axial protrusions of a further synchronizing ring, wherein an inner radial surface of each cam is provided with a plurality of grooves for transportation of oil.

2. A synchronizing ring according to claim 1, wherein each groove has a longitudinal extension direction in parallel with the longitudinal extension direction of the synchronizing ring.

3. A synchronizing ring according to claim 2, wherein the length of each groove is equal to the extension of the cam in the longitudinal extension direction of the synchronizing ring.

4. A synchronizing ring according to claim 1, wherein the synchronizing ring has a number of cams being a multiple of 3.

5. A synchronizing ring according to claim 1, wherein the synchronizing ring has a number of cams in the interval 3-9.

6. A synchronizing ring according to claim 1, wherein each cam has two main extension directions, one first main extension direction in the circumferential direction of the synchronizing ring and a second main extension direction in the radial direction of the synchronizing ring.

7. A synchronizing ring according to claim 1, wherein the total circumferential length of the cams is at least equal to the total circumferential length of the recesses between the cams.

8. A synchronizing ring according to claim 1, wherein each cam has 2-20 grooves.

9. A synchronizing ring according to claim 1, wherein the synchronizing ring is a blocking ring.

10. A synchronizing ring according to claim 1, wherein each cam has 3-10 grooves.

11. A synchronizing ring according to claim 1, wherein each cam has 4-8 grooves.

12. A synchronizer for a vehicle transmission, the synchronizer comprising a synchronizing ring, a component and a further synchronizing ring, the inside of the synchronizing ring being provided with a plurality of cams and corresponding recesses between the cams for receiving a plurality of axial protrusions of the further synchronizing ring, wherein an inner radial surface of each cam is provided with a plurality of grooves for transportation of oil from a gap formed between an axial surface of each cam and the component.

13. A synchronizer according to claim 12, wherein each groove has a longitudinal extension direction in parallel with an axial direction of the synchronizer.

14. A synchronizer according to claim 13, wherein the length of each groove is equal to the extension of the cam in the axial direction of the synchronizer.

15. A synchronizer according to claim 12, wherein the synchronizing ring is an external ring arranged outside of the further synchronizing ring being an inner ring.

16. A synchronizer according to claim 12, wherein said component is a hub of the synchronizer.

17. A synchronizer according to claim 12, wherein the synchronizer is a multi-cone synchronizer and the synchronizing ring is a blocking ring of the synchronizer.

* * * * *